3,058,883
ANTI-APHTHOUS PREPARATION
Carl Peter Värnet, 3 de Febrero 2030,
Buenos Aires, Argentina
No Drawing. Filed Feb. 9, 1961, Ser. No. 87,999
12 Claims. (Cl. 167—53)

My present invention refers to means for immunizing cloven-footed animals against the foot and mouth disease or aphthous fever.

The tremendous damages caused all over the world by the foot and mouth disease of the cattle are well known. Many thousands of animals year by year die or are to be killed and their cadavers to be destroyed on account of the aphthous fever. Therefore, efforts have been made and are still being made for efficiently attacking the virus of the aphthous fever. As a result thereof the corresponding vaccine is nowadays prepared and applied. However, up to date it has not yet been possible to abolish the foot and mouth disease of the cattle; the aphthous fever continues killing an extremely high number of animals and seriously affecting the production of meat and milk.

On the one hand, the action of the vaccine is not lasting. The effect of really immunizing the cattle is practically limited to about three months and thereafter gradually decreases. During this short period of immunity the virus of the aphthous fever not only may survive, but also may form a new virus type which in turn resists the known vaccine applied.

Finally, keeping in mind that this virus may be transported by birds of passage and even by fog, it will be readily understood that the anti-aphthous vaccines as hitherto prepared and applied are unable to combat the virus of the aphthous fever and less to entirely eliminate the foot and mouth disease of the cattle, and that the problem of an effective immunization of the cattle against the aphthous fever has not yet been solved.

In as far as the anti-aphthous vaccine as such is concerned, another disadvantage consists in that it maintains its efficiency only if it is stored at low temperature. This disadvantage brings about not only technical difficulties, but also the insecurity of the immunizing action of a vaccine applied to an animal.

The present invention aims at solving the problems referred to and at providing new means capable of avoiding in future the enormous damages caused by the foot and mouth disease of the cattle and of entirely eliminating this epizootic disease.

The main object of my invention is to provide preparations of long time lasting effect of immunizing cloven-footed animals against the aphthous fever, comprising an anti-aphthous vaccine in powder form elaborated in combination with inert vehicle means to resorbable, but impenetrable implantation bodies.

Another object of the invention is to provide anti-aphthous preparations of the class referred to, comprising an anti-aphthous vaccine in powder form and at least one finely divided inert resorbable vehicle substance for said powdered vaccine, homogeneously mixed and elaborated to relatively hard resorbable, but impenetrable implantation bodies.

Still another object of the invention is to provide anti-aphthous preparations of the class referred to, comprising a homogeneous and highly compressed mixture of an anti-aphthous vaccine in powder form and of at least one finely divided inert resorbable vehicle substance, in form of relatively hard resorbable, but impenetrable implantation bodies, and a moisture-repelling substance incorporated in the surface layer of said bodies except certain small surface area of the latter for providing at least one area of access for the animal humours to gradually and superficially reabsorb said implantation bodies.

In accordance with the invention, an anti-aphthous vaccine is prepared conveniently by lyophilization in powder form and this powdered vaccine is homogeneously mixed with the inert finely divided resorbable vehicle substance and is so proportioned that it is sufficient to immunize an animal for a period of about 3 to 5 years.

The vaccine in powder form proved to be able to maintain its immunizing effect for practically unlimited periods of time, if it is protected against contact with air and moisture.

In the anti-aphthous implantation bodies according to the invention, the powdered vaccine substance is so elaborated together with the vehicle means and said bodies are so compressed and protected that their complete reabsorption by the humours of the treated animals proceeds gradually and with such retardation that the animals are immunized during a period of time of e.g. 4 years.

The vehicle means for the powdered vaccine substance, applied in accordance with the invention, is a substance or mixture of substances which are inert, unable to cause local irritation, resorbable together with the vaccine substance, capable of being homogeneously mixed with the latter and, when compressed in mixture with the vaccine substance, are further capable of preventing the animal humours to penetrate into the implantation bodies and of only permitting a superficial reabsorption of the same by said animal humours.

Such vehicle substances are steroids, e.g cholesterol, stearic acid, and their mixtures e.g. with zinc oxide.

The pressure applied according to the invention for compressing the homogeneous mixture of the vaccine substance and of the vehicle means is of the range of from 50 to 1000 kg./cm.$^2$ and shall be conveniently such that an extremely hard body e.g. like marble is obtained, wherein the particles of the vaccine substance are strongly bonded by the vehicle means.

By means of this high pressure compression, on the one hand, as already stated a strong bond between the vaccine substance and the vehicle substance is obtained and, on the other hand, in dependence of the pressure applied, one succeeds in not only retarding the reabsorption of the implantation body by the humours of the animal, but also causing this reabsorption to only take place superficially on that surface or on those surfaces of the implantation body which permit a free access of the animal humours.

For providing such free access surface or surfaces the implantation body of e.g. oblong shape is conveniently provided with a protecting moisture-repelling surface layer except at one end or at both ends, produced in such a manner that it may be reabsorbed together with the combined vaccine and vehicle substance i.e. at the free access surfaces.

In this manner an implantation body is obtained wherein, except at said free access surfaces, the vaccine substance is so incorporated that it is gradually reabsorbed together with the other components of said body from the moment of its implantation in an animal until its complete reabsorption. During this period of time which may be extended to several e.g. 3 to 5 years, the implantation body continuously supplies the animal with the quantity of vaccine substance required for maintaining the animal immunized against the aphthous fever.

*Example*

The production of the anti-aphthous preparation according to the invention may be carried out as follows:

An anti-aphthous vaccine is prepared and purified to the highest possible degree of purity by known methods.

This vaccine, conveniently by lyophilization is transformed into a powder.

The powdered vaccine substance is homogeneously mixed with a finely divided vehicle substance, e.g. stearic acid, so that the resulting mixture contains between 10% and 50% of the vaccine substance, this proportion varying in accordance with the degree of purity of the vaccine, because the higher the degree of purity of the vaccine the lower may be its proportion in said mixture.

This mixture is then mechanically compressed under application of high pressure of the range of from 100 to 500 kg./cm.$^2$ into small conveniently oblong bodies of high density and hardness, wherein the particles of the vaccine substances are intimately and strongly bonded with the particles of the vehicle substance to such a degree that a reabsorption of the implantation bodies by the humours of the animals may proceed superficially only and that said reabsorption has to consume simultaneously and jointly the vaccine substance and the vehicle substance.

The implantation bodies thus produced are finally protected by a moisture-repelling surface layer produced in such a manner that a moisture-repelling, non-resorbable substance e.g. a suitable plastic material, is sprayed under high pressure onto the surface of said bodies with the result that said substance penetrates superficially into the bodies and becomes intimately bonded with its surfaces to such a degree that this non-resorbable substance is now resorbable together with the implantation bodies at determined surface area or areas where such moisture-repelling layer is not produced, e.g. at one or both ends of the oblong implantation bodies, which areas are provided as access surfaces for the humours of the treated animals.

The immunity period of 4 years which may be readily obtained with the preparations according to the present invention is absolutely sufficient for entirely abolishing the foot and mouth disease of the cattle. The animals reared for meat production generally have a life shorter than said immunity period, which means that they are entirely immunized by one treatment only and that the meat production is not affected any more. The animals destined for reproduction and for the production of milk may be periodically treated e.g. every three years for maintaining their immunity against the aphthous fever.

It will thus be readily understood that the present invention opens a new way for efficiently fighting against the aphthous fever and that, if this fight is simultaneously started in the different countries, the foot and mouth disease of the cattle may indeed be entirely abolished within a relatively short time.

What I claim as new and desire to secure by Letters Patent is:

1. An anti-aphthous preparation, comprising a homogeneous and highly compressed mixture of an anti-aphthous vaccine in powder form and of at least one finely divided inert resorbable vehicle substance, in form of relatively hard resorbable, but impenetrable implantation bodies, and a moisture-repelling substance incorporated in the surface layer of said bodies, except certain small surface area of the latter for providing at least one area of free access for the animal humours to gradually and superficially reabsorb said implantation bodies.

2. An anti-aphthous preparation as claimed in claim 1, wherein the said anti-aphthous vaccine is in lyophilized powder form.

3. An anti-aphthous preparation as claimed in claim 1, wherein the said vehicle means is a steroid.

4. An anti-aphthous preparation as claimed in claim 1, wherein the said vehicle means is cholesterol.

5. An anti-aphthous preparation as claimed in claim 1, wherein the said vehicle means is stearic acid.

6. An anti-aphthous preparation as claimed in claim 1, wherein the said vehicle means contain zinc oxide.

7. An anti-aphthous preparation as claimed in claim 1, wherein the said moisture-repelling substance incorporated in the surface layer of the implantation bodies is a synthetic plastic material.

8. An anti-aphthous preparation as claimed in claim 1, wherein the said homogeneous and highly compressed mixture of vaccine and vehicle substances contains about 10–50% of the anti-aphthous vaccine in powder form.

9. An anti-aphthous preparation as claimed in claim 1, wherein the said implantation bodies are oblong bodies formed by compression under application of high pressure of the range from about 50 to 1000 kg./cm.$^2$ and provided with the said area of free access for the animal humours at at least one end of said bodies.

10. An anti-aphthous preparation as claimed in claim 1, wherein the said anti-aphthous vaccine in powder form present in the implantation bodies is calculated for immunizing the animals for a period of about 3 to 5 years.

11. The method of immunizing cloven foot animals against aphthous fever over a prolonged period of time, which comprises implanting in the body of a cloven-footed animal a hard, resorbable, but impenetrable implantation body comprising a homogeneous and highly compressed mixture of an anti-aphthous vaccine in powder form and at least one finely divided inert resorbable vehicle substance, and a moisture-repelling substance incorporated in the surface layer of said body, except for a small surface area of the latter for providing at least one area of free access for the animal humours to gradually and superficially reabsorb said implantation body.

12. Method according to claim 11 in which said anti-aphthous vaccine in powder form is present in said implantation body in an amount calculated to immunize the animal for a period of about 3 to 5 years.

References Cited in the file of this patent

FOREIGN PATENTS

| | | |
|---|---|---|
| 86,558 | Norway | Nov. 28, 1955 |
| 156,145 | Sweden | July 12, 1956 |
| 534,476 | Belgium | Aug. 29, 1958 |

OTHER REFERENCES

Silver, Mfg. of Compressed Tablets, F. J. Stokes Machine Co., 1948, page 3.

Micche: Chem. Abst., 1956, vol. 50, page 5242(f).

Koren: J. Am. Pharm. Assoc., May 1949, pages 267–270.

Drug Trade News, February 1951, page 42.